United States Patent
Kelly

(10) Patent No.: US 8,931,232 B2
(45) Date of Patent: Jan. 13, 2015

(54) COWBOY-HAT SHAPED WASHER FOR A METAL ROOF DECK AND METHOD FOR FASTENING A ROOF DECK

(76) Inventor: Thomas L. Kelly, Waterbury, CT (US)

( * ) Notice: Subject to any disclaimer, the term of this patent is extended or adjusted under 35 U.S.C. 154(b) by 516 days.

(21) Appl. No.: 10/737,087

(22) Filed: Dec. 16, 2003

(65) Prior Publication Data

US 2005/0129487 A1 Jun. 16, 2005

(51) Int. Cl.
*E04D 3/36* (2006.01)
*E04D 3/365* (2006.01)
*F16B 43/00* (2006.01)

(52) U.S. Cl.
CPC .............. *F16B 43/00* (2013.01); *E04D 3/3606* (2013.01)
USPC .............. 52/550; 52/543; 52/748.1; 411/368; 411/531

(58) Field of Classification Search
USPC .................. 411/531, 545–547, 537–538, 533, 411/540–541, 975–976, 990–994, 120, 411/520–524, 943, 929.2, 132–137, 371.2, 411/368; 52/543, 549, 545, 550, 546, 544, 52/547, 520, 548, 551
See application file for complete search history.

(56) References Cited

U.S. PATENT DOCUMENTS

| | | | | |
|---|---|---|---|---|
| 592,896 A | * | 11/1897 | White .......................... | 411/116 |
| 606,145 A | * | 6/1898 | Hosier .......................... | 411/120 |
| 788,718 A | * | 5/1905 | Hawkins ....................... | 411/127 |
| 1,086,343 A | * | 2/1914 | Anderson ....................... | 249/25 |
| 1,286,862 A | * | 12/1918 | Williams .................. | 411/371.1 |
| 1,376,945 A | * | 5/1921 | Kristofek ........................ | 40/121 |
| 1,576,727 A | * | 3/1926 | Deniston, Jr. .............. | 411/371.1 |
| 1,631,812 A | * | 6/1927 | Hawkins ....................... | 105/410 |
| 1,649,436 A | * | 11/1927 | Abel ............................. | 411/116 |
| 1,771,167 A | * | 7/1930 | Dolan ........................... | 138/160 |
| 1,982,076 A | * | 11/1934 | Spahn ........................... | 411/133 |
| 2,412,120 A | * | 12/1946 | Bouchard ...................... | 351/141 |
| 2,666,252 A | * | 1/1954 | Temple ........................... | 29/432 |
| 2,836,989 A | * | 6/1958 | Schultz .......................... | 74/504 |
| 3,150,465 A | * | 9/1964 | Johnson ......................... | 52/537 |

(Continued)

OTHER PUBLICATIONS http://www.washerwerks.thomasregister.com/olc/73531303/4.htm archived to Oct. 8, 2003.*

(Continued)

*Primary Examiner* — Jack W Lavinder
(74) *Attorney, Agent, or Firm* — Cantor Colburn LLP

(57) ABSTRACT

Disclosed herein is a washer having a substantially planar annular area defining an opening for through passage of a fastener and a non-planar area radially outwardly disposed of the planar annular area. A method for fastening a roof deck comprising inserting a fastener through a washer having a substantially planar annular area and a non-planar area radially outwardly disposed of the planar annular area and driving the fastener through the roof deck or through an opening therein. A corrugated metal roof deck system comprising a subjacent support and a corrugated metal roof supported by the support. A waster having a substantially planar annular area defining an opening for through passage of a fastener and a second non-planar area radially outwardly disposed of said planar annular area with a fastener extending through said washer through said deck and into said subjacent support.

3 Claims, 1 Drawing Sheet

(56) References Cited

U.S. PATENT DOCUMENTS

| | | | | |
|---|---|---|---|---|
| 3,372,523 | A | * | 3/1968 | Hall, Jr. .......................... 52/699 |
| 4,150,465 | A | * | 4/1979 | Gavin, Jr. ........................ 52/512 |
| 4,186,541 | A | * | 2/1980 | Sivachenko .................... 52/630 |
| 4,303,001 | A | * | 12/1981 | Trungold ........................ 411/10 |
| 4,483,648 | A | * | 11/1984 | Trungold ........................ 411/10 |
| 4,554,773 | A | * | 11/1985 | Conley ........................... 52/521 |
| 4,987,714 | A | * | 1/1991 | Lemke ............................ 52/410 |
| 5,385,433 | A | * | 1/1995 | Calandra et al. ........... 405/302.1 |
| 5,605,423 | A | * | 2/1997 | Janusz ........................ 411/387.6 |
| 5,618,491 | A | * | 4/1997 | Kurup et al. .................... 420/77 |
| 5,681,136 | A | * | 10/1997 | Blair ............................. 411/160 |
| 5,797,711 | A | * | 8/1998 | Mulgrave et al. ............. 408/226 |
| 5,915,903 | A | * | 6/1999 | Osterle et al. ................. 411/531 |
| 6,146,056 | A | * | 11/2000 | Calandra, Jr. .............. 405/302.1 |
| 6,361,257 | B1 | * | 3/2002 | Grant ............................. 411/154 |
| 2003/0110589 | A1 | * | 6/2003 | Lin .................................. 16/66 |
| 2004/0175252 | A1 | * | 9/2004 | Kurczynski .................. 411/120 |

OTHER PUBLICATIONS http://www.washerwerks.thomasregister.com/olc/73531303/5.htm archived to Jun. 28, 2003.*
McMaster-Carr catalog p. 3061 (first publication date unknown).*
http://www.kemlite.com/sequentia_corrugated/corrugated_installation.cfm discloses use of neoprene (i.e., 'plastic') washers with a corrugated sheet.*
http://www.corrugated-iron-club.info/words.html.*
http://www.corrugated-iron-club.info/tech.html.*
http://www.corrugated-iron-club.info/dur07.html.*
http://www.fastfixdirect.co.uk/code/navigation.asp?fType=Fasteners&MainCategoryID=15.*
http://www.slecladding.co.uk/fixings.htm.*
http://www.m-osaka.com/en/exhibitors/193/index.html.*
Definition of "sheet material" as defined by www.primarydandt.org/learn/glo_0000000336.asp.*
SLE Cladding Limited, p. 6, "Galvanized/Plated Washers", Feb. 2003.*

* cited by examiner

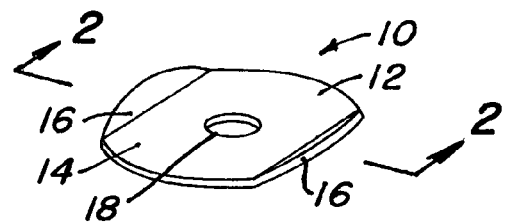
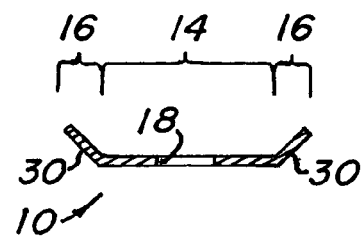
FIG. 1                    FIG. 2
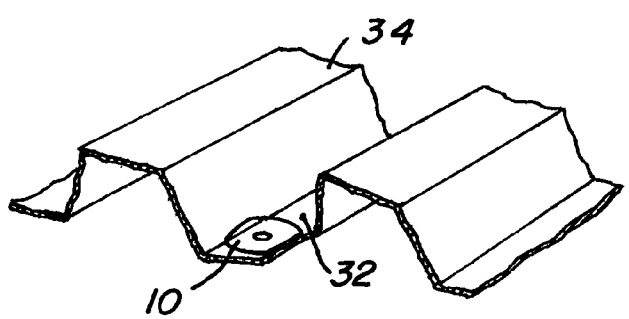
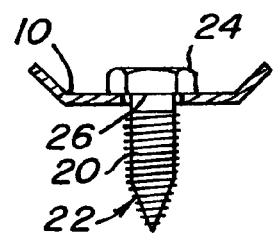
FIG. 3                    FIG. 4

COWBOY-HAT SHAPED WASHER FOR A METAL ROOF DECK AND METHOD FOR FASTENING A ROOF DECK

BACKGROUND

Metal roof decking, usually but not exclusively corrugated, is employed in many commercial buildings and storage buildings as well as some residential buildings. Most metal decks are paddle welded to the underlying structure. Welding is inconsistent and weak. It is also subject to rust and corrosion because it burns the protective coating off both sides of the steel decking at its interface. Recently some metal roof decking material is affixed by fasteners such as screws. To spread to a larger surface area any load placed on the roof deck by the screw head during wind uplift or similar events, a flat washer has commonly been placed under the screw head. While this does indeed spread some of the load of the screw, it also causes a point stress especially in corrugated decking material. This point stress is created where the flat washer intersects the curved corrugation.

Roof failures have occurred due to penetration of the roof deck at these point stress points during wind uplift and consequent tearing of the roof decking from the penetration point around the fasteners. This of course leads to an easy undesired removal of the roof assembly after sufficient fastening points have been compromised causing extreme deck deflection in high winds.

SUMMARY

Disclosed herein is a unique and novel washer having parallel edges bent up like the edges of a cowboy hat brim. A washer having a substantially flat annular area defining an opening for through passage of a fastener and a bent radially outwardly disposed of the planar annular area.

A method for fastening a roof deck comprising inserting a fastener through a washer having a substantially flat area and a bent area radially outwardly disposed of the flat area such that the washer resembles a cowboy hat and driving the fastener through the cowboy hat washer, through an opening therein the roof deck and into the underlying structural support beam.

A corrugated metal roof deck system comprising a subjacent support and a corrugated metal roof supported by the support. A washer having a substantially flat area defining an opening for through passage of a fastener and a bent area radially outwardly disposed of said flat area with a fastener extending through the washer, through the deck and into the subjacent support.

BRIEF DESCRIPTION OF THE DRAWINGS

Referring now to the drawings wherein like elements are numbered alike in the several Figures:

FIG. 1 is a perspective view of a washer as disclosed herein;
FIG. 2 is a cross-sectional view;
FIG. 3 is a perspective view of a washer of FIG. 1 in a trough of a metal corrugated deck for a roof; and
FIG. 4 is a cross-sectional view similar to FIG. 2 with a fastener extended therethrough.

DETAILED DESCRIPTION

Referring to FIGS. 1 and 2 simultaneously, washer 10 comprises an expanse of material 12 of 1¼" (in one embodiment) having a first section 14 and at least one second section 16. Material 12 defines an opening 18 for through passage of a separate structure. In one embodiment the separate structure is a fastener such as a nail or screw. Opening 18 may be dimensioned to closely approximate a nominal diameter of the shank 20 of the fastener 22 intended to pass therethrough such that a head 24 of such fastener (FIG. 4) cannot pass through. In one embodiment, the first section 14 includes a substantially flat area 18 of washer 10 which is sized sufficiently to be contacted in a substantially flush manner by undersurface 26 of head 24 of fastener 22. The second section 16 of which includes bent areas 30. The bent areas 30 of section 16 are in one embodiment bent in a parallel manner to one another and cause the washer 10 to resemble a cowboy hat brim. The shape advantageously closely approximates a shape of a trough 32 (FIG. 3) in a corrugated metal deck 34 (such as a type "B" corrugated metal deck or other corrugated material). Because of the bent configuration of the washer, there are no significant stress points created by the washer on a corrugated roof deck during a wind uplift condition. Without the stress points, the fastener/washer assembly is far less likely to pull through the roof deck or have the roof deck rip through the washer. Accordingly, failure is deferred to much higher wind uplift pressures and fatigue cycling. In testing of the device and method disclosed herein, the roof deck did not fail at maximum test criteria of 225 pounds per square foot and 280 pounds per square foot at two respective testing facilities. It is to be understood that although the term "bent" suggests a metallic structure of washer 10 and even though a metallic structure is indeed contemplated, other materials may be employed including plastics. In the case of metals or plastics, the washer may either be bent as described or may be molded as such.

The method for fastening a roof deck comprises producing a washer having characteristics described hereinabove. This can be accomplished by such means as stamping, rolling, hot forming, molding, casting, etc.

The formed washer is then deposited on a fastener of a type and shape capable of passing through the opening in washer 10 as described above. In this condition the fastener and washer combination is driven through the deck with the fastener extending into a subjacent support.

A roof deck secured with a plurality of the fastener/washer combination described herein is capable of withstanding extraordinarily high wind uplift forces without failure.

While preferred embodiments have been shown and described, modifications and substitutions may be made thereto without departing from the spirit and scope of the invention. Accordingly, it is to be understood that the present invention has been described by way of illustrations and not limitation.

What is claimed is:
1. A method for fastening a corrugated metal roof deck comprising:
 depositing a washer consisting of an:
 expanse of metal material having a circular outer periphery if rendered flat with a first surface and a second surface remaining substantially the same distance from each other throughout the expanse of the washer;
 a single opening in the expanse of material of the washer dimensioned to closely receive a fastener therethrough, said single opening being defined by a flat area of the washer, a relatively upper surface of the flat area running substantially parallel to a relatively lower surface of the flat area;
 two bent areas disposed out of contact with each other, said two bent areas immediately adjoining and radially outwardly disposed of the flat area, the two bent areas disposing both the first and second surface of the washer out of plane with the flat area of the washer such that extended planes of said two bent areas intersect said plane of said flat area, said two bent area causing said washer to substantially nest with, and be used in conjunction with corrugations of the corrugated metal roof deck, wherein an entire major surface of the entire washer is configured to lie flush against of the corrugated metal roof deck;

driving said fastener through a type B corrugated metal roof deck into a structural joist;

orienting said washer complementarily to said roof deck such that said bent areas of the washer extend away from floors of the corrugations along and in contact with trough walls of the corrugations; and securing said washer and roof deck by tightening said fastener against the structural underlying joist.

2. A roof assembly comprising:

a washer consisting of an:

expanse of metal material having a circular outer periphery if rendered flat with a first surface and a second surface remaining substantially the same distance from each other throughout the expanse of the washer;

a single opening in the expanse of material of the washer dimensioned to closely receive a fastener therethrough, said single opening being defined by a flat area of the washer, a relatively upper surface of the flat area running substantially parallel to a relatively lower surface of the flat area;

two bent areas disposed out of contact with each other, said two bent areas immediately adjoining and radially outwardly disposed of the flat area, the two bent areas disposing both the first and second surface of the washer out of plane with the flat area of the washer such that extended planes of said two bent areas intersect said plane of said flat area, said two bent area causing said washer to substantially nest with, and be used in conjunction with corrugations of the corrugated metal roof deck, wherein an entire major surface of the entire washer is configured to lie flush against of the corrugated metal roof deck;

wherein said fastener affixes said washer to a type B corrugated metal roof deck and a structural joist, said washer being disposed complementarily to said roof deck such that said bent areas of the washer extend away from floors of the corrugations along and in contact with trough walls of the corrugations, and said washer being secured to said roof deck via a tightening of said fastener against the structural underlying joist.

3. A roof assembly consisting of:

a washer having an:

expanse of metal material having a circular outer periphery if rendered flat with a first surface and a second surface remaining substantially the same distance from each other throughout the expanse of the washer;

a single opening in the expanse of material of the washer dimensioned to closely receive a fastener therethrough, said single opening being defined by a flat area of the washer, a relatively upper surface of the flat area running substantially parallel to a relatively lower surface of the flat area;

two bent areas disposed out of contact with each other, said two bent areas immediately adjoining and radially outwardly disposed of the flat area, the two bent areas disposing both the first and second surface of the washer out of plane with the flat area of the washer such that extended planes of said two bent areas intersect said plane of said flat area, said two bent area causing said washer to substantially nest with, and be used in conjunction with corrugations of the corrugated metal roof deck, wherein an entire major surface of the entire washer is configured to lie flush against of the corrugated metal roof deck;

wherein said fastener affixes said washer to a type B corrugated metal roof deck and a structural joist, said washer being disposed complementarily to said roof deck such that said bent areas of the washer extend away from floors of the corrugations along and in contact with trough walls of the corrugations, and said washer being secured to said roof deck via a tightening of said fastener against the structural underlying joist.

* * * * *